United States Patent
Minior et al.

(10) Patent No.: US 10,595,324 B2
(45) Date of Patent: Mar. 17, 2020

(54) METHOD AND APPARATUS FOR SERVER-BASED SCHEDULING OF NETWORK TRAFFIC TO A MOBILE DEVICE

(71) Applicant: MOTOROLA SOLUTIONS, INC, Chicago, IL (US)

(72) Inventors: Krzysztof Minior, Rudawa (PL); Przemyslaw L. Bogucki, Cracow (PL); Virat G. Patel, Des Plaines, IL (US); Steven E. Vanswol, Lombard, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/753,995

(22) PCT Filed: Dec. 11, 2015

(86) PCT No.: PCT/PL2015/050068
§ 371 (c)(1),
(2) Date: Feb. 21, 2018

(87) PCT Pub. No.: WO2017/099613
PCT Pub. Date: Jun. 15, 2017

(65) Prior Publication Data
US 2018/0295636 A1  Oct. 11, 2018

(51) Int. Cl.
*H04W 72/12* (2009.01)
*H04L 29/08* (2006.01)
(Continued)

(52) U.S. Cl.
CPC .......... *H04W 72/12* (2013.01); *H04L 45/72* (2013.01); *H04L 47/72* (2013.01); *H04L 47/78* (2013.01);
(Continued)

(58) Field of Classification Search
CPC . H04W 72/0446; H04W 72/12; H04W 28/26; H04L 45/72; H04L 67/26; H04L 47/72; H04L 47/78
See application file for complete search history.

(56) References Cited

U.S. PATENT DOCUMENTS 6,044,069 A * 3/2000 Wan ................. H04W 52/0216
                                                  370/311
8,135,392 B2    3/2012 Marcellino et al.
(Continued)

FOREIGN PATENT DOCUMENTS

| EP | 2599363 B1 | 2/2018 |
|----|-----------|--------|
| WO | 2012071283 A1 | 5/2012 |
| WO | 2014106183 A1 | 7/2014 |

OTHER PUBLICATIONS

Hsing Mei et al.: "Performance enhancement of Web-based push transmitter with channel scheduling",Computer Software and Applications Conference, 2000. COMPSAC 2000. The 24th Annual International Taipei, Taiwan Oct. 25-27, 2000, Los Alamitos, CA, USA,IEEE Comput. Soc, US,Oct. 25, 2000 (Oct. 25, 2000), pp. 377-382.

(Continued)

*Primary Examiner* — Gary Mui (57) ABSTRACT

A method and apparatus are provided for synchronizing network traffic to a mobile device from each of multiple servers, wherein each such server can independently determine when to send traffic to the mobile device. More particularly, each of the multiple servers receives, from the mobile device, a value that uniquely identifies the mobile device from among multiple mobile devices. The server determines a time slot value based on the received value and assigns a time slot to the mobile device based on the determined time slot value. The server then transmits data to the mobile device in the assigned time slot. By each of the (Continued)

multiple servers determining the time slot value, and the assigned time slot, based on a same value received from the mobile device, the multiple servers are able to synchronize their transmissions to the mobile device without need of a common, intermediary, push notification service.

15 Claims, 4 Drawing Sheets

(51) Int. Cl.
*H04L 12/911* (2013.01)
*H04W 28/26* (2009.01)
*H04L 12/721* (2013.01)
*H04W 72/04* (2009.01)
*H04W 88/02* (2009.01)

(52) U.S. Cl.
CPC ............ *H04L 67/26* (2013.01); *H04W 28/26* (2013.01); *H04W 72/0446* (2013.01); *H04W 88/02* (2013.01)

(56) References Cited

U.S. PATENT DOCUMENTS

| | | | |
|---|---|---|---|
| 8,688,826 B2 | 4/2014 | Black et al. | |
| 9,049,179 B2 | 6/2015 | Luna | |
| 2003/0095540 A1 | 5/2003 | Mulligan et al. | |
| 2006/0217119 A1 | 9/2006 | Bosch et al. | |
| 2008/0165709 A1* | 7/2008 | Soliman | H04W 88/06 370/280 |
| 2009/0187593 A1* | 7/2009 | Chen | G06Q 30/0204 |
| 2010/0250986 A1 | 9/2010 | Black et al. | |
| 2011/0310854 A1* | 12/2011 | Zou | H04W 74/0833 370/336 |
| 2013/0242936 A1* | 9/2013 | Igo, Jr. | H04B 1/713 370/330 |
| 2014/0016624 A1* | 1/2014 | Zou | H04W 4/70 370/336 |
| 2015/0063190 A1* | 3/2015 | Merlin | H04L 5/0037 370/312 |
| 2015/0189535 A1 | 7/2015 | Bekiares et al. | |
| 2015/0249515 A1* | 9/2015 | Wu | H04L 12/2801 370/442 |
| 2015/0373649 A1* | 12/2015 | Tabet | H04W 52/24 370/329 |

OTHER PUBLICATIONS

The International Search Report and the Written Opinion corresponding patent application No. PCT/PL2015/050068, dated Dec. 11, 2015, all pages.

* cited by examiner

SERVER
*132*

| TIMESLOTS | | | |
|---|---|---|---|
| MD 101 | MD 102 | MD 103 | MD 104 |
| 00:00:01 | 00:00:02 | 00:00:03 | 00:00:04 |
| 00:02:01 | 00:02:02 | 00:02:03 | 00:02:04 |
| 00:04:01 | 00:04:02 | 00:04:03 | 00:04:04 |
| etc | etc | etc | etc |

~502

SERVER
*134*

| TIMESLOTS | | | |
|---|---|---|---|
| MD 101 | MD 102 | MD 103 | MD 104 |
| 00:00:01 | 00:00:02 | 00:00:03 | 00:00:04 |
| 00:02:01 | 00:02:02 | 00:02:03 | 00:02:04 |
| 00:04:01 | 00:04:02 | 00:04:03 | 00:04:04 |
| etc | etc | etc | etc |

METHOD AND APPARATUS FOR SERVER-BASED SCHEDULING OF NETWORK TRAFFIC TO A MOBILE DEVICE

FIELD OF THE INVENTION

The present invention relates generally to communication systems and, in particular, to server-based scheduling of network traffic to a mobile device.

BACKGROUND OF THE INVENTION

Mobile devices frequently receive low-throughput and/or small amounts of data from multiple content providers/servers, such as status updates from presence services or pushed data from any of many push services known in the art, for example, push email, instant messaging, visual voicemail, and others. Such applications typically require an always-on IP connection. Each transaction puts the mobile device in a high power mode for a considerable length of time—typically between 15-30 seconds. As the high power mode can consume as much as 100× the power as an idle mode, these network-initiated applications quickly drain a battery of the mobile device. The issue has been exacerbated by the rapid increase in popularity of such applications, which are network-initiated functionalities.

Furthermore, different messages from difference services may cause a user to frequently look at his or her mobile device, which can be distracting for the user and can further drain the battery, for example, by repeatedly illuminating a display screen of the mobile device.

Conventionally this problem is solved in mobile devices with the help of a common push notification service which maintains a single long-lived connection with a push notification client running on the mobile device. In such scenarios, each Application Server is required to send its notifications to the common push notification service and the push notification service forwards the notifications to a push notification client, which in turn forwards the notifications on to the appropriate client application. The notification messages have the relevant identifiers and addressing for the Push Notification Server and Client to broker the delivery of asynchronous notifications. Such a technique has notable drawbacks, such as: (1) Single Point of Failure, that is, the Push Notification Service; (2) Security—introducing an intermediary in the communication path between the client and server introduces security holes; (3) Trust Boundaries—when considering most common mobile operating systems, such as Android or iOS, the push notification servers are hosted in security domains different from the Application Servers, and certain class of users, such as Public Safety customers, financial organizations, etc., would want to restrict flow of information outside of the security domain setup by the customer; and (4) Presence of a specialized push notification client, which may not be feasible on all types of devices.

BRIEF DESCRIPTION OF SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

A method and apparatus are provided for synchronizing network traffic to a mobile device from each of multiple servers, wherein each server of the multiple servers can independently determine when to send traffic to the mobile device and wherein the multiple servers do not require a common push notification service in order to synchronize the sending of the traffic. More particularly, each of the multiple servers receives, from the mobile device, a value that uniquely identifies the mobile device from among multiple mobile devices. The server determines a time slot value based on the received value and assigns a time slot to the mobile device based on the determined time slot value. The server then transmits data to the mobile device in the assigned time slot. By each of the multiple servers determining the time slot value, and the assigned time slot, based on a same value received from the mobile device, the multiple servers are able to synchronize their transmissions to the mobile device without the need for a common, intermediary, push notification service.

In one embodiment of the present invention, a method is disclosed for scheduling network traffic to a mobile device from a server. The method includes receiving, by the server from the mobile device, a value that uniquely identifies the mobile device among multiple mobile devices; determining, by the server, a time slot value based on the received value; assigning, by the server, a time slot to the mobile device based on the determined time slot value; and transmitting data to the mobile device in the time slot.

Another embodiment of the present invention encompasses a server comprising a network interface, a processor, and an at least one memory device that is configured to store a set of instructions that, when executed by the processor, cause the processor to perform the following functions: receive, from a mobile device, a value that uniquely identifies the mobile device among multiple mobile devices; determine a time slot value based on the received value; assign a time slot to the mobile device based on the determined time slot value; and transmit, via the network interface, data to the mobile device in the time slot.

Yet another embodiment of the present invention encompasses a system for synchronizing network traffic from multiple servers. The system includes a first server that is configured to: receive, from a mobile device, a value that uniquely identifies the mobile device among multiple mobile devices; determine a first time slot value based on the received value; assigning a first time slot to the mobile device based on the determined time slot value; and transmit data to the mobile device in the first time slot. The system further includes a second server that is configured to: receive, from the mobile device, the value that uniquely identifies the mobile device; determine a second time slot value based on the received value; assign a second time slot to the mobile device based on the determined second time slot value, wherein the first time slot and the second time slot occur at the same time; and transmit data to the mobile device in the second time slot.

Figure 1:
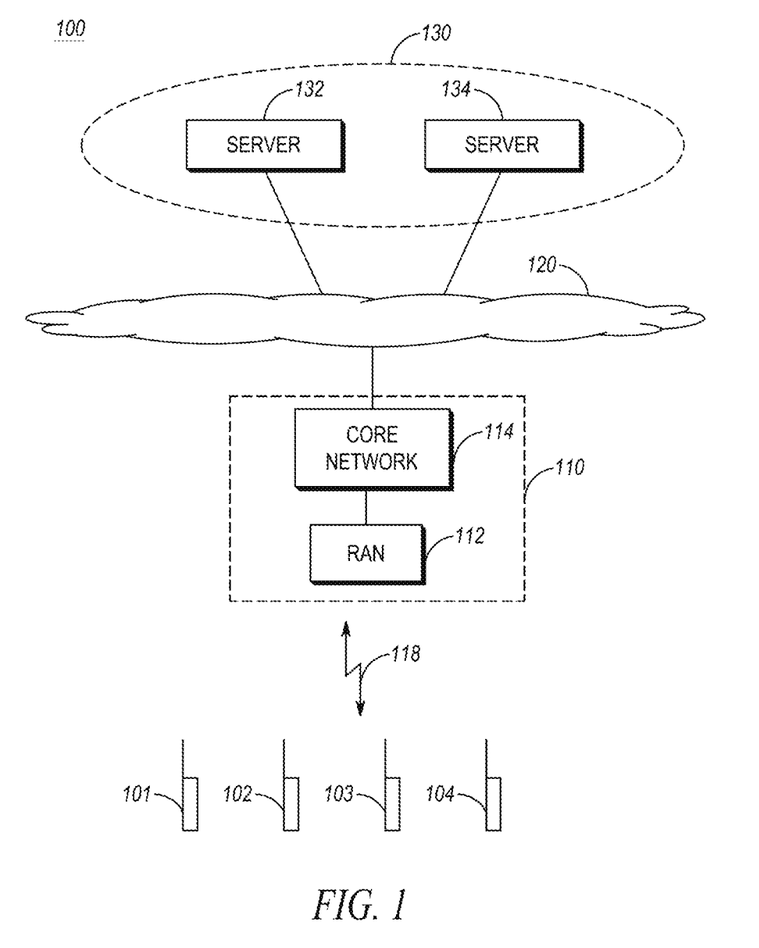
FIG. 1 is a block diagram of a wireless communication system in accordance with various embodiments of the present invention.

The present invention may be more fully described with reference to FIGS. 1-5. FIG. 1 is a block diagram of a wireless communication system 100 in accordance with some embodiments of the present invention. Communication system 100 includes multiple wireless mobile devices 101-104 (four shown), for example but not limited to a cellular telephone, a smart phone, a land mobile radio (LMR), a vehicle modem, a server mounted in vehicle, or a tablet, laptop, or body-worn computing device equipped for wireless communications, etc. In various radio technologies, a mobile device such as mobile devices 101-104 may be referred to as a user equipment (UE), a subscriber station (SS), an access terminal (AT), a mobile station (MS), or the like. Each mobile device 101-104 includes one or more application layer clients which communicate with corresponding elements of a service network 150.

Communication system 100 further includes a wireless communication network 110 that includes a radio access network (RAN) 112 that is coupled to a core network 114. RAN 110 that provides wireless communications service to mobile devices residing in a coverage area of the RAN via an air interface 116. Air interface 116 includes an uplink and a downlink, which uplinks and downlinks each includes multiple traffic channels and multiple signaling channels.

Communication system 100 further includes a service network 130 that is accessible by mobile devices 101-104 via network 110 and a data network 120, such as a private network or the Internet. Service network 130 includes multiple application servers 132, 134 (two shown), that is, application functions (AFs) that are each capable of providing an application layer service. For example, each of servers 132 and 134 may provide a push email service, an instant messaging service, a visual voicemail service, voice and video telephony service, and so on. RAN 112, core network 114, data network 114, and servers 132, 134 collectively comprise an infrastructure of communication system 100 and, correspondingly, may be referred to as infrastructure elements of communication system 100.

Figure 2:
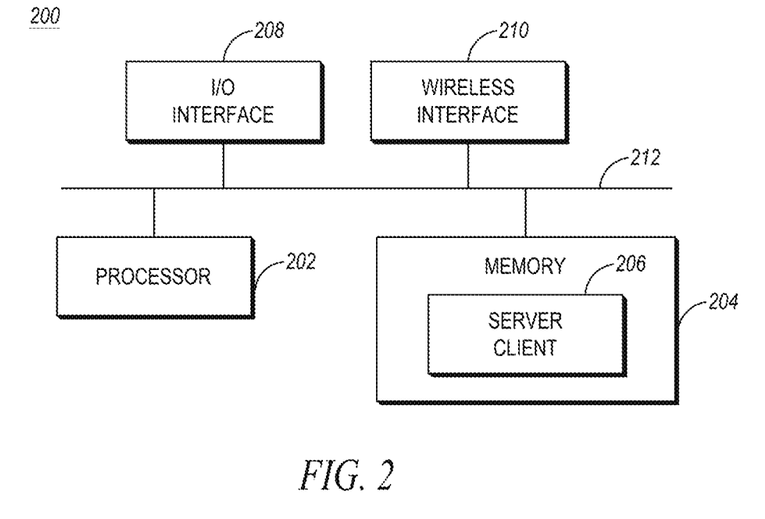
FIG. 2 is a block diagram of a user equipment of the communication system of FIG. 1 in accordance with an embodiment of the present invention.

Referring now to FIG. 2, a block diagram of a mobile device 200, such as mobile devices 101-104, is provided in accordance with some embodiments of the present invention. Mobile device 200 generally includes a processor 202, at least one memory device 204, one or more input/output (I/O) interfaces 208, and one or more wireless interfaces 210 (one shown). It should be appreciated by those of ordinary skill in the art that FIG. 2 depicts mobile device 200 in an oversimplified manner, and a practical embodiment may include additional components and suitably configured processing logic to support known or conventional operating features that are not described in detail herein. The components (202, 204, 208, 210) of mobile device 200 are communicatively coupled via a local interface 212. Local interface 212 can be, for example but not limited to, one or more buses or other wired or wireless connections, as is known in the art. Local interface 212 can have additional elements, which are omitted for simplicity, such as controllers, buffers (caches), drivers, repeaters, and receivers, among many others, to enable communications. Further, local interface 212 may include address, control, and/or data connections to enable appropriate communications among the aforementioned components.

Mobile device 200 operates under the control of processor 202, such as one or more microprocessors, microcontrollers, digital signal processors (DSPs), combinations thereof or such other devices known to those having ordinary skill in the art. Processor 202 operates the corresponding mobile device according to data and instructions stored in the at least one memory device 204, such as random access memory (RAM), dynamic random access memory (DRAM), and/or read only memory (ROM) or equivalents thereof, that stores data and instructions that may be executed by the corresponding processor so that the mobile device may perform the functions described herein.

The one or more I/O interfaces 208 may include user interfaces that allow a user to input information in, and receive information from, mobile device 200. For example, the user interfaces may include a keypad, a touch screen, a scroll ball, a scroll bar, buttons, bar code scanner, and the like. Further, the user interfaces may include a display device such as a liquid crystal display (LCD), touch screen, and the like for displaying system output. I/O interfaces 208 also can include, for example, a serial port, a parallel port, a small computer system interface (SCSI), an infrared (IR) interface, a universal serial bus (USB) interface, and the like for communicating with, or coupling to, an external device. The one or more wireless interfaces 210 facilitate an exchange of wireless communications with an access network, such as RAN 112. For example, the one or more wireless interfaces 210 may include transceivers for wireless wide area communications, such as a wireless area network (WAN), and/or for wireless local area network (WLAN) communications.

The data and instructions maintained by at least one memory device 204 include software programs that include an ordered listing of executable instructions for implementing logical functions. For example, the software in at least one memory device 204 includes a suitable operating system (O/S) and programs. The operating system essentially controls the execution of other computer programs, and provides scheduling, input-output control, file and data management, memory management, and communication control and related service. The programs may include various applications, add-ons, etc. configured to provide user functionality with mobile device 200, for example, at least one memory device 204 maintains a server client 206 that, when executed by processor 202, facilitates a peer-to-peer exchange of signaling and traffic with a server 132, 134 of service network 130.

Figure 3:
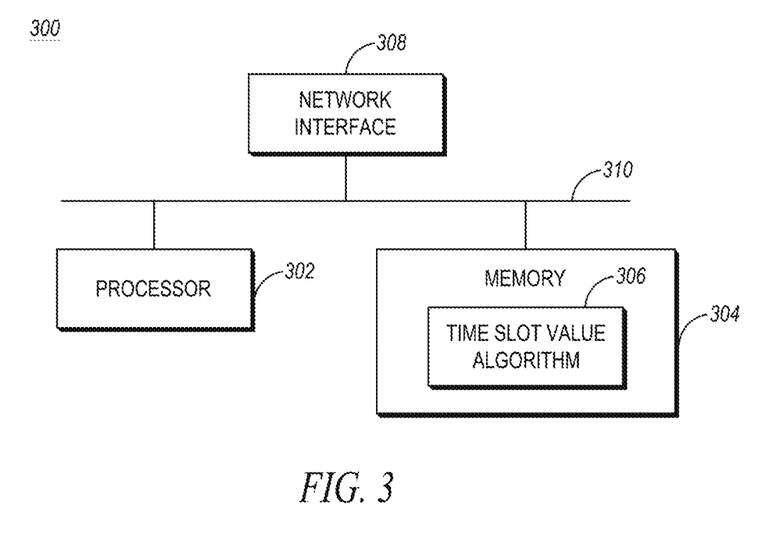
FIG. 3 is a block diagram of an application server of the communication system of FIG. 1 in accordance with an embodiment of the present invention.

Referring now to FIG. 3, a block diagram is provided of a server 300, such as server 132 and 134, in accordance with an embodiment of the present invention. Server 300 includes a processor 302, such as one or more microprocessors, microcontrollers, digital signal processors (DSPs), combinations thereof or such other devices known to those having ordinary skill in the art. Server 300 further includes an at least one memory device 304, such as random access memory (RAM), dynamic random access memory (DRAM), and/or read only memory (ROM) or equivalents thereof, that is in communication with a corresponding processor 302, via a corresponding local interface 310. At least one memory device 304 stores data and programs that may be executed by processor 302 and that allows the server to perform all functions necessary to operate in communication system 100. For example, at least one memory device 304 stores a time slot value algorithm 306 that, when executed by processor 302, generates one or more time slot values that may be used by the server to select time slots for a transmission, by the server, of data to mobile devices.

Server 300 further includes one or more network interfaces 308 (one shown) that is in communication with processor 302 via local interface 310 and that provides for interfacing with other infrastructure elements of communication system 100, such as data network 120 and, via the data network, with network 110 and mobile devices 101-104. Local interface 310 can be, for example but not limited to, one or more buses or other wired or wireless connections, as is known in the art. Local interface 310 can have additional elements, which are omitted for simplicity, such as controllers, buffers (caches), drivers, repeaters, and receivers, among many others, to enable communications. Further, local interface 310 may include address, control, and/or data connections to enable appropriate communications among the aforementioned components of the server.

Figure 4:
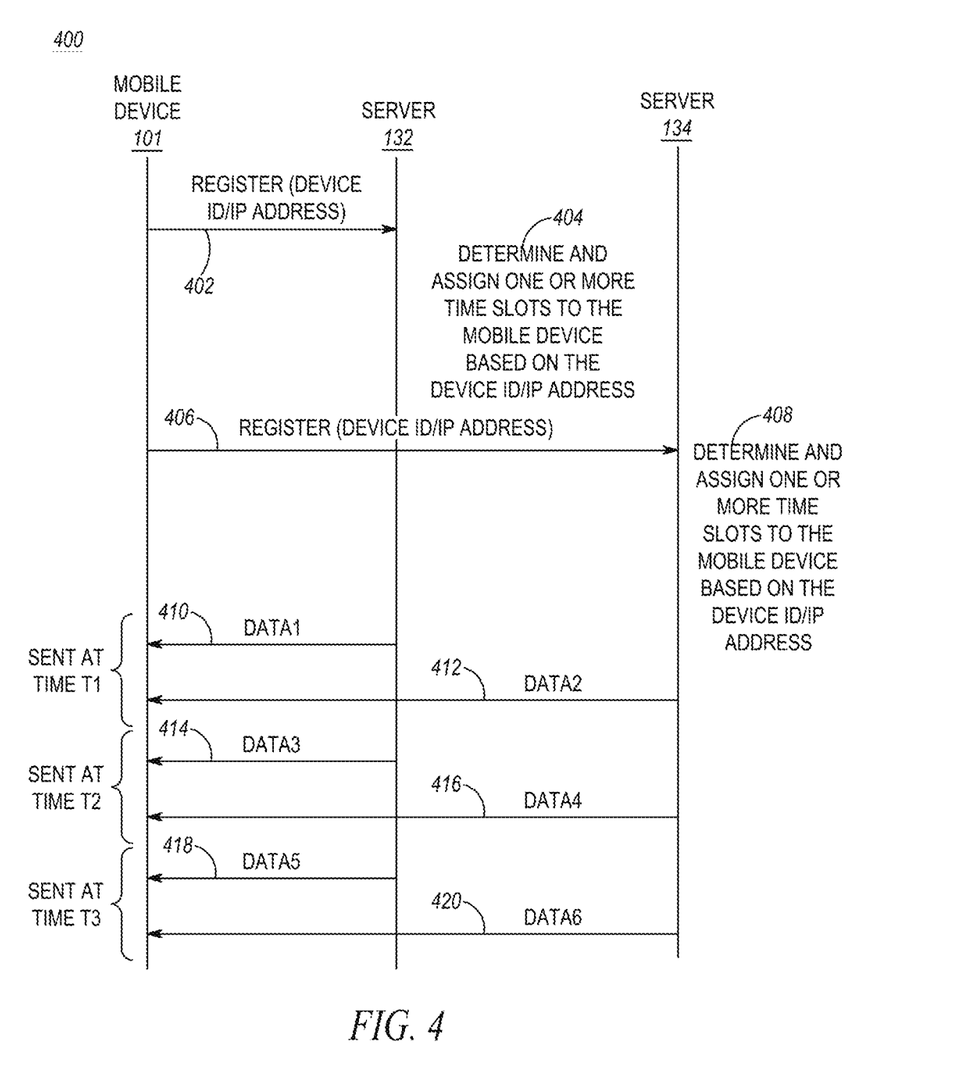
FIG. 4 is a signal flow diagram illustrating a method executed by the communication system of FIG. 1 in synchronizing network traffic to a mobile device from the multiple application servers in accordance with some embodiments of the present invention.

Referring now to FIG. 4, a signal flow diagram 400 is provided that illustrates a method executed by communication system 100 for server-based synchronization of network traffic to a mobile device, such as mobile device 101, from multiple servers, such as servers 132 and 134, in accordance with some embodiments of the present invention. Signal flow diagram 400 begins when a mobile device of the multiple mobile devices 101-104, for example, mobile device 101, registers (402, 406) with each of the multiple servers 132, 134 for a provision of an application layer service in accordance with well-known registration techniques. As part of the registration process, mobile device 101 provides each of the multiple servers 132, 134, with a value that is unique to, and therefore can be used to identify, the mobile device in communication system 100, wherein a same value is provided to each of the multiple servers. For example, the value may be an identifier of a mobile device such as routing address, for example, an Internet Protocol (IP) address, or mobile device identifier as known in the art, for example, a Subscriber Unit ID (SUID), a Mobile Subscriber ISDN Number (MSISDN), an International Mobile Equipment Identity (IMEI), or an International Mobile Subscriber Identity (IMSI), an electronic serial number (ESN), and so on, that may be used to uniquely identify mobile device 101 in communication system 100.

Further, in some embodiments of the present invention, as part of the registration process, the mobile device may provide, to each of the multiple servers 132, 134, capabilities of the mobile device, such as the type of mobile device and various applications, or versions of applications, supported by the mobile device, and further may provide an identifier of a user of the mobile device and/or profile information concerning the user. In other embodiments of the present invention, in response to receiving an identifier of the user, each of servers 132 and 134 may retrieve user-related information, such as a role of the user, for example, a fireman, a policeman, or a hazardous material ('hazmat') responder, a rank of the user, for example, captain, commander, shift leader, battalion chief, detective, and so on, and/or a user priority associated with that role or rank relative to users of other mobile devices, from a user profile database, such as a Home Subscription Server (HSS).

In response to receiving the value from mobile device 101, each of the multiple servers 132, 134 uses the received value to determine (404, 408) one or more time slots for assignment to the mobile device. That is, based on the value received from mobile device 101 and by reference to time slot value algorithm 306, a first server of the multiple servers 132, 134, for example, server 132, determines (404) a first one or more time slot values, wherein the input to the algorithm is the value received from the mobile device and the output of the algorithm are the first one or more time slot values. For example, the time slot value algorithm may be a mapping function that maps the received value, such as the mobile device identifier, to a value associated with the time slots. For example, such an algorithm may include a hash function that hashes the mobile device identifier received from the mobile device to generate one or more time slot values. Based on the determined first one or more time slot values, the server 132 then assigns (404) a first one or more time slots to the mobile device 101. For example, each determined time slot value may correspond to a time that a time slot is transmitted and/or may correspond to a time slot number.

Similarly, based on the value received from mobile device 101 and by reference to time slot value algorithm 306, a second server of the multiple servers 132, 134, for example, server 134, determines (408) a second one or more time slot values, wherein the input to the algorithm is the value received from the mobile device and the output of the algorithm are the second one or more time slot values. Based on the determined second one or more time slot values, the server 132 then assigns (408) a second one or more time slots to the mobile device 101.

The time slot value algorithms utilized by servers 132 and 134 further may consider a user role, rank, priority and/or activity level (for example, how often information is downloaded to a given user by a given server) of the user in determining the one or more time slot values, wherein the period of time expiring between assigned time slots is less for users of a more important role, of a higher rank, of a higher priority, and/or of a higher activity level than the time expiring between assigned time slots for users of a lesser role and/or a lower rank, priority, and/or activity level. For example, and merely for the purpose of illustrating the principles of then present invention, a user of a more important role and/or a higher rank, priority, and/or activity level may be assigned a time slot every five (5) seconds, while a user of a lesser role and/or a lower rank, priority, and/or activity level may be assigned a time slot every fifteen (15) seconds. From another perspective, the time slot value algorithm may determine a shorter window, that is, the period of time expiring between assigned time slots, for a user of a more important role and/or a higher rank, priority, and/or activity level may have, whereas the time slot value algorithm may determine a longer window for users of a less important role and/or a lower rank, priority, and/or activity level.

Since each of the multiple servers 132, 134 utilizes a same time slot value algorithm 306 to generate the one or more time slot values and utilizes a same algorithm input, that is, a same value received from a given mobile device, each of the multiple servers 132, 134 calculates a same one or more time slot values and, resultantly, assigns time slots occurring at a same time for transmission of data to the mobile device.

For example, suppose that, based on the value received from mobile device 101, each server 132 and 134 determines the same multiple time slot values 'T1,' 'T2,' and 'T3.' Further, suppose that each of these time slot values is a time that a time slot is transmitted, that is, a first time T1, a second time T2, and a third time T3. As a result, server 132 transmits (410), via its network interface, first data (DATA1) in a first time slot that occurs at time T1 and server 134 transmits (412), via its network interface, second data (DATA2) in a second time slot that also occurs at time T1. Further, server 132 transmits (414), via its network interface, third data (DATA3) in a third time slot that occurs at time T2 and server 134 transmits (416), via its network interface, fourth data (DATA4) in a fourth time slot that also occurs at time T2. And server 132 transmits (418), via its network interface, fifth data (DATA5) in a fifth time slot that occurs at time T3 and server 134 transmits (420), via its network interface, sixth data (DATA6) in a sixth time slot that also occurs at time T3. Signal flow diagram 400 then ends.

Figure 5:
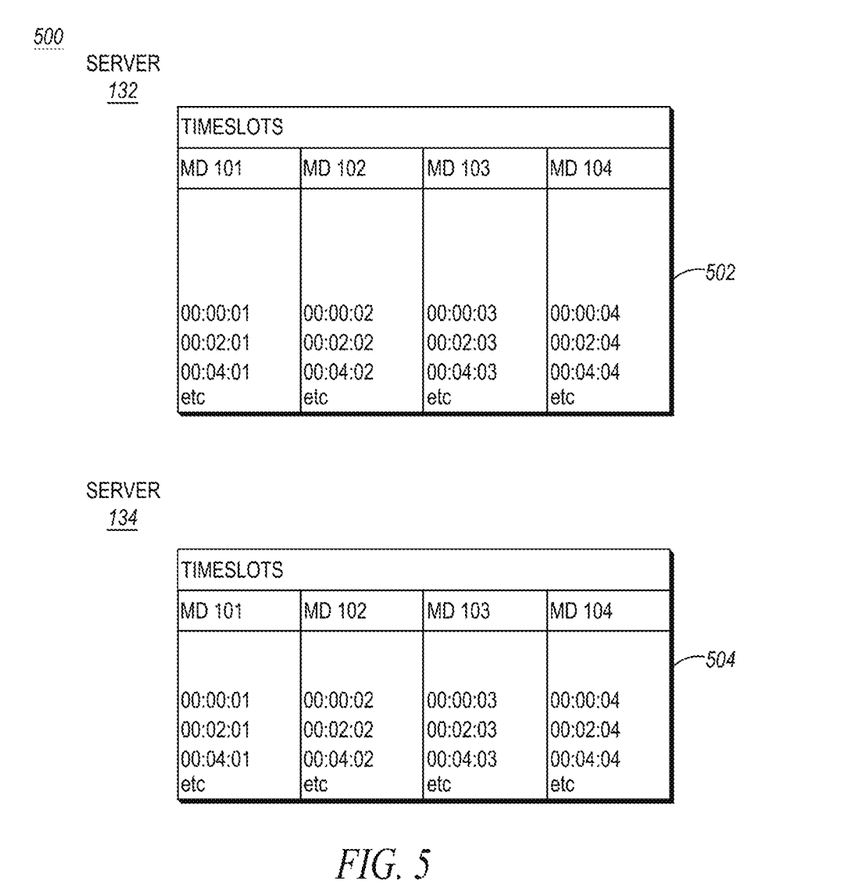
FIG. 5 depicts tables that may be generated by time slot value algorithms executed by the servers of the communication system of FIG. 1 in accordance with an embodiment of the present invention.

For example and merely for the purpose of illustrating the principles of the present invention, FIG. 5 depicts a first table 502 that may be generated by a time slot value algorithm 306 executed by server 132 and a second table 504 that may be generated by a time slot value algorithm 306 executed by server 132. Tables 502 and 504 list time slot values determined for each of mobile devices 101-104 based on mobile device identifiers provided to the servers by the mobile devices. As depicted in FIG. 5, time slot value algorithm 306 executed by server 132 generates the multiple time slot values 00:00:01, 00:02:01, and 00:04:01 for mobile device 101, which are the same as the time slot values generated for mobile device 101 by the time slot value algorithm 306 executed by server 134. These values may represent time slots that then are assigned by servers 132 and 134 to mobile device 101. For example, the values may represent times that each time slot is transmitted, or the values may represent time slot numbers to time slots in which data intended for mobile device 101 is embedded. As the time slot value algorithms utilized by each of servers 132 and 134 are the same, each of servers 132 and 134 will transmit data to mobile device 101 at a same time.

Similarly, the time slot value algorithm 306 executed by each of servers 132 and 134 generates the same multiple time slot values, that is, 00:00:02, 00:02:02, and 00:04:02 for mobile device 102, the same multiple time slot values, that is, 00:00:03, 00:02:03, and 00:04:03 for mobile device 103, and the same multiple time slot values, that is, 00:00:04, 00:02:04, and 00:04:04 for mobile device 104. For example, the time slot value algorithms may hash an identifier of each of mobile devices 101, 102, 103, and 104, for example, the values '101,' '102,' '103,' and '104,' to produce the least significant number, that is, the right-hand value, of each of these time slot values. Thus, servers 132 and 134 will assign a same time slot to each mobile device 101-104, yet will assign different time slots to different mobile devices.

Again, and merely for the purpose of illustrating the principles of the present invention, suppose that the time slot value 00:00:01 corresponds to a first time slot transmitted at time 'T1'=0 minutes, 1 second; that the time slot value 00:02:01 corresponds to a second time slot transmitted at time 'T2'=2 minutes, 1 second; and that the time slot value 00:04:01 corresponds to a third time slot transmitted at time 'T3'=4 minutes, 1 second. Thus each of servers 132 and 134 will assign to a first mobile device 101 of the multiple mobile devices 101-104, and transmit data to mobile device 101, at time slots associated with times T1, T2, and T3. Similarly, suppose that the time slot value 00:00:02 corresponds to a fourth time slot transmitted at a time 'T4'=0 minutes, 2 seconds; that the time slot value 00:02:02 corresponds to a fifth time slot transmitted at a time 'T5'=2 minutes, 2 seconds; and that the time slot value 00:04:02 corresponds to a sixth time slot transmitted at a time 'T6'=4 minutes, 2 seconds. Thus each of servers 132 and 134 will assign to a second mobile device 102 of the multiple mobile devices 101-104, and transmit data to mobile device 102, at time slots associated with times T4, T5, and T6, which are different time slots than the time slots assigned to, and used for transmissions to, mobile device 101. Further, suppose that the time slot value 00:00:03 corresponds to a seventh time slot transmitted at a time 'T7'=0 minutes, 3 seconds; that the time slot value 00:02:03 corresponds to an eighth time slot transmitted at a time 'T8'=2 minutes, 3 seconds; and that the time slot value 00:04:03 corresponds to a ninth time slot transmitted at a time 'T9'=4 minutes, 3 seconds. Thus each of servers 132 and 134 will assign to a third mobile device 103 of the multiple mobile devices 101-104, and transmit data to mobile device 103, at time slots associated with times T7, T8, and T9, which are different time slots than the time slots assigned to, and used for transmissions to, each of mobile device 101 and 102.

By transmitting its data at a same time, the data sent by each of servers 132 and 134 should arrive at RAN 116 at approximately a same time, thereby allowing the RAN to include the data from the servers in a same packet intended for mobile device 101. For example, the data may be included in a payload of the packet along with an identifier of the source of the data, thereby allowing mobile device 101 to determine the source of the data when the mobile device parses the packet. By way of another example, RAN 116 may include the data in successive packets intended for mobile device 101, thereby allowing the mobile device to receive both packets at approximately a same time, minimizing a frequency that the mobile device needs to wake up to monitor an overhead channel to determine whether a packet is being transmitted to the mobile device, then wake up again to receive the packet, then wake up yet again to monitor the overhead channel to determine whether another packet is being transmitted to the mobile device, and then wake up again to receive the another packet. Further, by including the data in a same packet or successive packets, the frequency with which the mobile device needs to notify a user of the mobile device that data has been received, and to illuminate its display screen to display such data, is minimized.

The embodiments of the present invention preferably are implemented within each of mobile devices 101-104 and servers 132 and 134, and more particularly with or in software programs and instructions stored in the at least one memory devices 204, 304 and executed by the processors 202, 302 of the mobile devices and service network elements. However, one of ordinary skill in the art realizes that the embodiments of the present invention alternatively may be implemented in hardware, for example, integrated circuits (ICs), application specific integrated circuits (ASICs), and the like, such as ASICs implemented in one or more of mobile devices 101-104 and servers 132 and 134, and all references to 'means for' herein may refer to any such implementation of the present invention. Based on the present disclosure, one skilled in the art will be readily capable of producing and implementing such software and/or hardware without undo experimentation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the expressions "air interface" and "wireless link" are intended to be used interchangeably herein.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for scheduling network traffic to a mobile device from a first server, the method comprising:
   receiving, by the server from the mobile device, a value that uniquely identifies the mobile device among multiple mobile devices;
   receiving, by the server from the mobile device, an identifier of a user of the mobile device;
   retrieving, by the server from a user profile database, user-related information;
   determining, by the server, a first time slot value based on the received value and the retrieved user-related information;
   assigning, by the server, a first time slot to the mobile device based on the determined first time slot value;
   transmitting data to the mobile device in the first time slot;

receiving, by a second server from the mobile device, the value that uniquely identifies the mobile device;

determining, by the second server, a second time slot value based on the received value;

assigning, by the second server, a second time slot to the mobile device based on the determined second time slot value, wherein the first time slot and the second time slot occur at the same time; and transmitting data to the mobile device in the second time slot.

2. The method of claim 1, wherein the received value comprises one or more of a mobile device identifier and a routing address of the mobile device.

3. The method of claim 1, wherein determining a first time slot value based on the received value comprises applying a mapping function that maps the received value to a value associated with the first time slot.

4. The method of claim 3, wherein the mapping function comprises a hash function.

5. The method of claim 1, wherein the mobile device is a first mobile device and wherein the method further comprises:

receiving, by the server from a second mobile device, a second value that uniquely identifies the second mobile device among multiple mobile devices;

determining, by the server, a second time slot value based on the second value received from the second mobile device, wherein the second time slot value determined for the second mobile device is different than the first time slot value determined for the first mobile device;

assigning, by the server, a second time slot to the second mobile device based on the second time slot value determined for the second mobile device, wherein the second time slot assigned to the second mobile device occurs at a different time than the first time slot assigned to the first mobile device; and transmitting second data to the second mobile device in the second time slot assigned to the second mobile device.

6. The method of claim 1, wherein determining a first time slot value based on the received value comprises determining a plurality of time slot values based on the received value and wherein determining the plurality of time slot values comprises determining a window of time associated with the plurality of time slot values based on one or more of a role, rank, priority, and activity level of a user of the mobile device.

7. The method of claim 1, wherein the first time slot value and the second time slot value are a same time slot value.

8. The method of claim 1, wherein determining, by the first server, a first time slot value and determining, by the second server, a second time slot value comprises executing, by each of the first server and the second server, a time slot value algorithm that is the same for both servers.

9. A system for synchronizing network traffic from a plurality of servers, the system comprising:

a first server configured to:

receive, from a mobile device, a value that uniquely identifies the mobile device among multiple mobile devices;

determine a first time slot value based on the received value;

assigning a first time slot to the mobile device based on the determined time slot value; and transmit data to the mobile device in the first time slot;

a second server configured to:

receive, from the mobile device, the value that uniquely identifies the mobile device;

determine a second time slot value based on the received value;

assign a second time slot to the mobile device based on the determined second time slot value, wherein the first time slot and the second time slot occur at the same time; and transmit data to the mobile device in the second time slot.

10. The system of claim 9, wherein the first time slot value and the second time slot value are a same time slot value.

11. The system of claim 9, wherein the received value comprises one or more of a mobile device identifier and a routing address of the mobile device.

12. The system of claim 9, wherein the first server is configured to determine a first time slot value by executing a time slot value algorithm maintained by the first server, wherein the second server is configured to determine a second time slot value by a time slot value algorithm maintained by the second server, and wherein the time slot value algorithms maintained by the first server and the second server are a same algorithm.

13. The system of claim 12, wherein the time slot value algorithm comprises a mapping function that maps the received value to a value associated with the time slot.

14. The system of claim 13, wherein the mapping function comprises a hash function.

15. The system of claim 12, wherein each time slot value algorithm determines a plurality of time slot values based on the received value and wherein determining the plurality of time slot values comprises determining a window of time associated with the plurality of time slot values based on one or more of a role, rank, priority, and activity level of a user of the mobile device.

* * * * *